J. H. McGEE.
NUT AND BOLT LOCK.
APPLICATION FILED JAN. 28, 1914.

1,165,615.

Patented Dec. 28, 1915.

WITNESSES

Samuel Payne

Max H. Srolovitz

INVENTOR

J. H. McGee.

BY Henry C. Evert

ATTORNEY

UNITED STATES PATENT OFFICE.

JAMES HENERY McGEE, OF BUTLER, PENNSYLVANIA, ASSIGNOR OF ONE-EIGHTH TO JAMES H. COE AND ONE-EIGHTH TO ALFRED L. TURNER, BOTH OF BUTLER, PENNSYLVANIA.

NUT AND BOLT LOCK.

1,165,615.  Specification of Letters Patent.  Patented Dec. 28, 1915.

Application filed January 28, 1914. Serial No. 815,072.

*To all whom it may concern:*

Be it known that I, JAMES H. MCGEE, a citizen of the United States of America, residing at Butler, in the county of Butler and State of Pennsylvania, have invented certain new and useful Improvements in Nut and Bolt Locks, of which the following is a specification, reference being had therein to the accompanying drawing.

This invention relates to nut and bolt locks, and has for its object to provide means, in a manner as hereinafter set forth, to prevent a bolt turning with respect to a nut or the nut with respect to the bolt, whereby when the bolt and nut is utilized for connecting a plurality of elements together, said elements will be maintained clamped and prevented from becoming loose due to the fact that the nut cannot screw off the bolt as both the nut and bolt will be prevented from rotative movement.

Further objects of the invention are to provide a nut and bolt lock, which is simple in its construction and arrangement, strong, durable, efficient and convenient in its use, readily set up and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Figure 1:
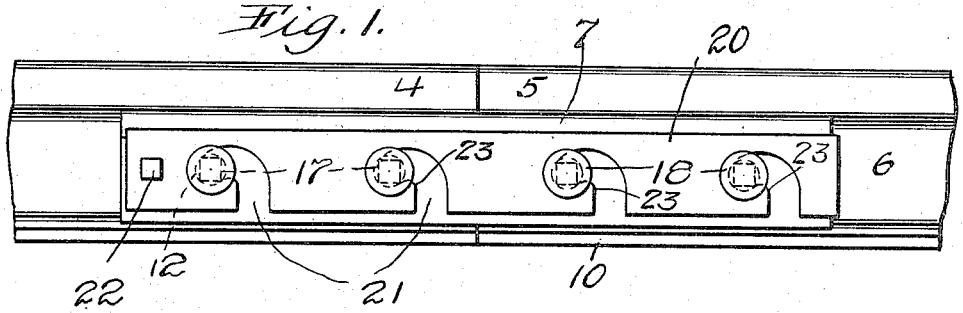
Figure 2:
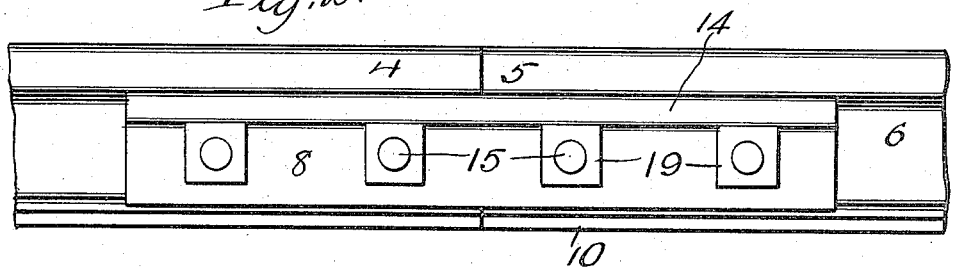
Figure 3:
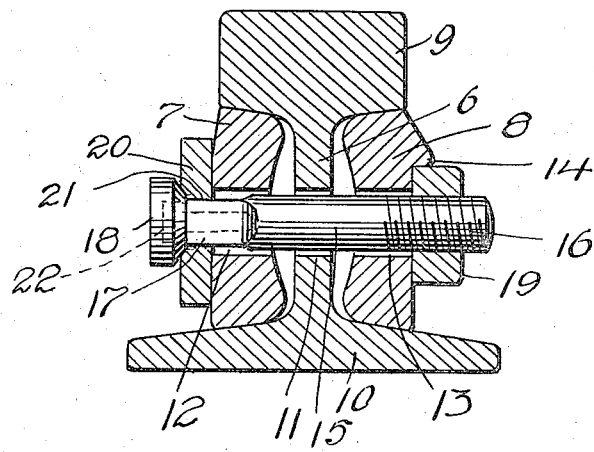

In the drawings, wherein like reference characters denote corresponding parts throughout the several views:—Figure 1 is a side elevation of a nut and bolt lock in accordance with this invention, showing the adaptation thereof in connection with a rail joint and illustrating the bolt locking element. Fig. 2 is a like view illustrating the nut locking element, and Fig. 3 is a cross sectional view.

A nut and bolt lock in accordance with this invention is particularly adapted for use in connection with rail joints, but it is to be understood that it is adapted for any purposes wherein it is found applicable.

Referring to the drawings in detail, 4 and 5 denote a pair of track rails, which are arranged in longitudinal alinement, with their ends abutting and positioned at each side of the webs 6 of said rails 4 and 5 are fish plates 7 and 8, which extend from the heads 9 to the bases 10 of said rails 4 and 5. The webs 6 are formed with openings 11 and the fish plates 7 and 8 with openings 12 and 13 respectively, which register with the openings 11. The outer face of the fish plate 8, near the top thereof is provided with a longitudinally extending rib 14.

Extending through each set of alining openings 11, 12 and 13 is the shank 15 of a bolt, one end of the shank is peripherally square as at 17. That part of the shank other than the squared portion 17 is cylindrical and formed integral with the squared portion 17 is a head 18.

Mounted upon the threaded portions of each shank 15 is a nut 19, which abuts against the fish plate 8 and has one facet thereof overlapped and engaged by the rib 14, thereby preventing rotative movement of the nut 19 when in clamping position.

The squared portions 17 of the shanks 15 extend beyond the fish plate 7 and are adapted to be received within the slots 21 disposed transversely of the plate 7. The slots 21 are open and have their inner ends substantially semi-circular to afford the shoulders 23 whereby the plate 20 is effectively engaged with the portions 17 of the shanks 15, it being understood that the portions 17 are positioned at the inner ends of the slots 21 when the plate 20 is in applied position. It is also desirable to employ the stud or locking bolt 22 disposed through one end portion of the plate 20 and coacting with the fish plate 7 for positively holding said plate 20 in applied position.

What I claim is:—

1. In combination with a bolt having a portion angular in cross section, a plate provided with an open end slot, the inner portion of the slot being substantially semi-circular to afford a retaining shoulder, the angular portion of the bolt being positioned at the inner end of the slot when the plate is in applied position, and means for clamping the plate to the work.

2. In combination with a bolt having a portion angular in cross section, a plate provided with an open end slot, the inner portion of the slot being substantially semi-circular to afford a retaining shoulder, the angular portion of the bolt being positioned at the inner end of the slot when the plate is in applied position, the slot in the plate being disposed transversely thereof, and means for clamping the plate to the work.

In testimony whereof I affix my signature in the presence of two witnesses.

JAMES HENERY McGEE.

Witnesses:
HARRY A. OSWALD,
CARL H. STARR.

Copies of this patent may be obtained for five cents each, by addressing the "Commissioner of Patents, Washington, D. C."